(12) United States Patent
Bader

(10) Patent No.: US 6,404,151 B1
(45) Date of Patent: Jun. 11, 2002

(54) ELECTRIC VEHICLE DRIVE

(75) Inventor: Christian Bader, Boeblingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/567,059

(22) Filed: May 8, 2000

(30) Foreign Application Priority Data

May 8, 1999 (DE) ........................................ 199 21 450

(51) Int. Cl.$^7$ ............................................... H02P 1/00
(52) U.S. Cl. .................. 318/39; 318/106; 318/107; 318/108; 318/109; 318/110; 318/111; 320/104; 320/127; 320/128; 320/134; 320/135; 320/149; 320/163; 363/21; 363/80
(58) Field of Search ............................... 318/106, 107, 318/108, 109–111, 139; 320/104, 127, 128, 134, 135, 149, 163, 21, 80

(56) References Cited

U.S. PATENT DOCUMENTS

| | | | |
|---|---|---|---|
| 4,023,081 A | * 5/1977 | Murray et al. | 318/109 |
| 5,212,431 A | * 5/1993 | Origuchi et al. | 318/139 |
| 5,309,073 A | * 5/1994 | Kaneko et al. | 318/500 |
| 5,428,274 A | * 6/1995 | Furutani et al. | 318/139 |
| 5,515,937 A | * 5/1996 | Adler et al. | 180/65.2 |
| 5,670,851 A | * 9/1997 | Numazaki | 318/106 |
| 5,675,222 A | * 10/1997 | Fliege | 318/139 |
| 5,801,498 A | * 9/1998 | Kusano et al. | 318/139 |
| 5,998,885 A | * 12/1999 | Tamor et al. | 307/10.1 |
| 6,124,645 A | * 9/2000 | Jones et al. | 290/9 |
| 6,127,813 A | * 10/2000 | Tamagawa | 322/16 |

FOREIGN PATENT DOCUMENTS

| | | | |
|---|---|---|---|
| DE | 41 18 594 | 8/1992 | |
| DE | 195 22 563 | 1/1997 | |
| DE | 196 28 877 | 1/1998 | |
| DE | 198 10 467 | 10/1999 | |
| GB | 2 271 228 | 4/1994 | |
| JP | 9-9417 | 1/1997 | |
| JP | 409009417 A | * 1/1997 | ........... B60L/11/18 |

OTHER PUBLICATIONS

German Opposition Proceedings—Jul. 16, 2001 with attachments.

German Opposition Proceedings—Oct. 6, 2000 with attachments.

* cited by examiner

Primary Examiner—Jeffrey Donels
Assistant Examiner—Tyrone Smith
(74) Attorney, Agent, or Firm—Crowell & Moring LLP

(57) ABSTRACT

An electric vehicle drive has an electric machine which can be alternatively driven as a motor or as a generator and has a d.c. connection to which a supply voltage can be applied, from a first energy source and/or a second energy source. The first energy source is designed for base load supply of the electric machine, while the second energy source comprises an energy accumulator designed for a short-term peak load supply of the electric machine. Also, vehicle braking energy can be stored by way of the electric machine in its generator operating mode. According to the invention, the second energy source in the form of an energy accumulator is coupled via a bidirectional DC/DC converter to a supply connection of the first energy source connected with the direct-voltage connection of the electric machine.

4 Claims, 1 Drawing Sheet

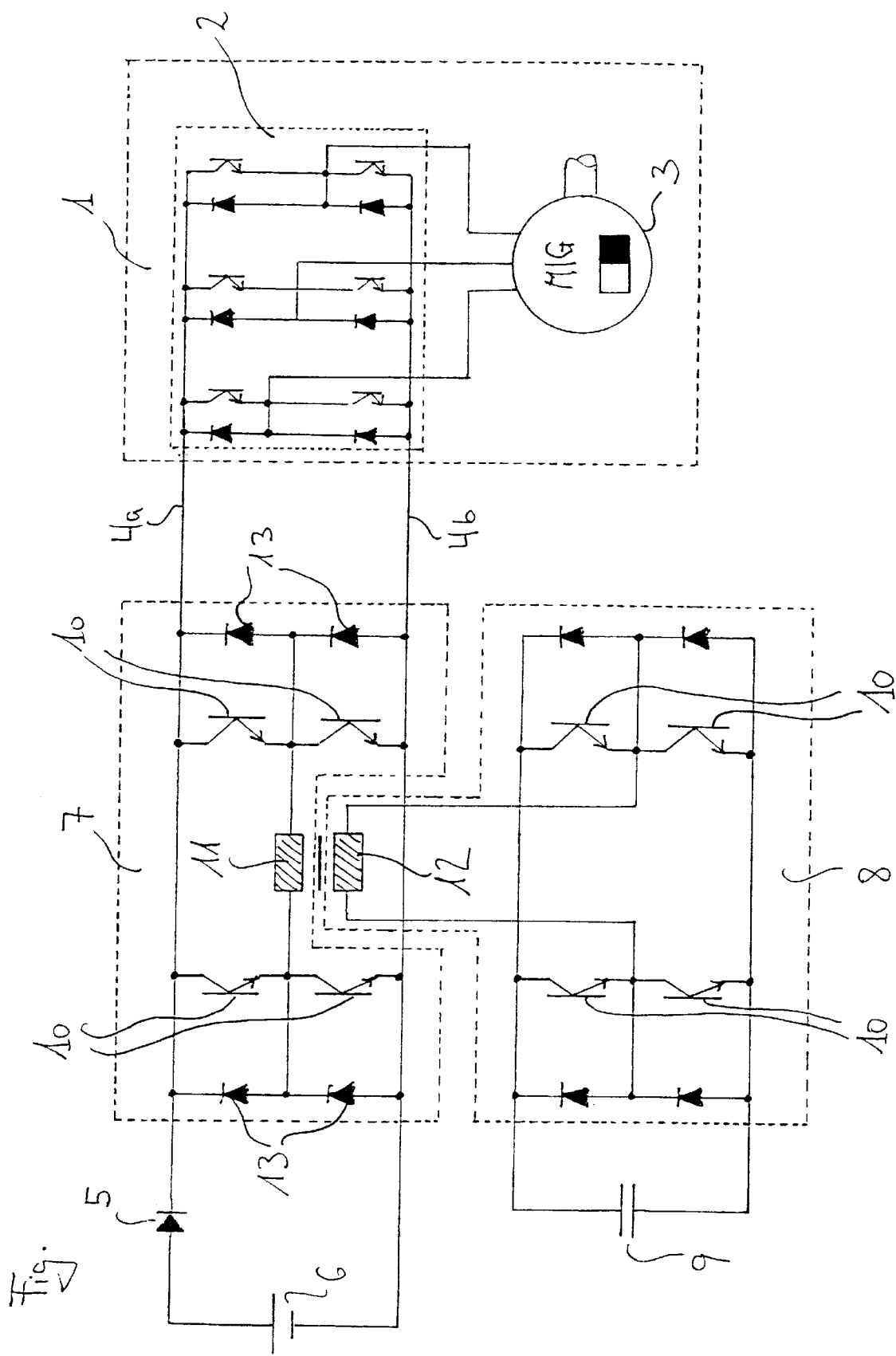

ELECTRIC VEHICLE DRIVE

BACKGROUND AND SUMMARY OF THE INVENTION

This application claims the priority of German patent document 199 21 450.6, filed May 8, 1999, the disclosure of which is expressly incorporated by reference herein.

The invention relates to an electric vehicle drive having an electric machine which can be driven alternatively as a motor or as a generator, and has a direct voltage connection to which a supply voltage can be applied, from a first energy source and a second energy source. The first energy source is designed for base load supply of the electric machine, while the second energy source comprises an energy accumulator designed for short-term peak load supply of the electric machine. Also, vehicle braking energy can be stored by way of the electric machine in its generator operating mode.

One problem associated with electric vehicle drives is that they must meet load profiles which fluctuate greatly with respect to time. However, conventionally used energy sources and energy accumulators can be optimized only with respect to a certain load profile. That is, accelerating operations require the provision of short-term power peaks; in contrast, for longer drives at a constant speed, a constant base load is required for a longer time period. Heretofore, there have been no electric energy accumulators or energy sources which are suitable both for the delivery of fairly large amounts of energy within a short time and for an unchangeable base load for a fairly long time period, and also have a power/weight ratio which is justifiable.

By a corresponding design of the electrodes, it is possible for a battery to provide high power for a short time (such as in the case of a lead starter battery, which is adapted in this manner). However, such a design leads to a reduced energy accumulating capacity of the battery. Battery systems on an alkaline base, such as nickel metal hydride batteries, also permit high power deliveries for a short time. However, they also have a limited energy accumulating capacity. Capacitors are also typical "power accumulators" with a limited accumulating capacity. On the other hand, metal/air batteries are known to have a high energy accumulating capacity, achieving gravimetric energy densities of up to 200 Wh/kg—more than twice as high as those achieved in the best conventional electrochemical energy accumulators. However, such batteries can be utilized only in the case of a discharge which is largely constant with respect to time.

When vehicles are braked, the braking energy converted into electric energy can be accumulated well in those electric energy accumulators which are also suitable for the input of high power peaks. However, a battery with a high internal resistance, which is incapable of delivering high power peaks for accelerations (to the extent achieved, for example, by nickel/metal hydride batteries) because of its characteristic, is also unable to absorb all energy occurring during such regenerative braking. Inversely, while the accumulating capacity is, however, limited, lead starter batteries as well as capacitor banks and fly wheels are capable of a high power input for a short time, such as occurs when braking energy is converted to electric energy.

In contrast to batteries, fuel cells provide electric energy sources in which no electric charge is accumulated. If electric driving energy is generated by means of a fuel cell, a reaccumulation of braking energy cannot take place without an additional accumulator of electric energy. In this case, braking energy converted into electric energy can be dissipated only without recoverability for the vehicle drive in an electric braking resistance.

An electric vehicle drive of the initially mentioned type is disclosed in German Patent Document DE 41 18 594 C1. Two electric energy accumulators with differing load profiles are assigned to the vehicle drive, and a discharge operation control device and automatic control device control, the supply of electric energy alternately from one, the other, or from both energy accumulators to the electric vehicle drive. In this case, the first energy accumulator is a high-performance battery which can provide a largely constant base load supply; while the second energy accumulator is a smaller battery which is connected to the energy accumulator when load peaks are present. Both energy accumulators are charged either by a connection with an electric supply network or during a braking or coasting operation of the motor vehicle assigned to the electric vehicle drive.

German Patent Document DE 195 22 563 A1 discloses an electric vehicle which has a traction battery and a capacitor accumulator, with braking being provided by way of the electric driving motor. Electric energy recovered in the process is supplied to the capacitor accumulator, and is intermediately stored there. As the result, a service-life-reducing exceeding of the maximal charging current of the traction battery is avoided.

German Patent Document DE 196 28 877 A1 discloses a motor vehicle having an electric machine and a battery constructed as a large-scale energy accumulator for providing a constant driving power. In addition, another high-performance energy accumulator is provided which is constructed as a power capacitor, a gyro accumulator, a spring-type accumulator or a pressure-type accumulator. During driving at a constant speed on a flat road, energy is taken only from the large-scale energy accumulator. If additional energy is required for acceleration operations or driving on slopes, energy can be taken from the high-performance energy accumulator. It is provided to brake the motor vehicle by means of the electric machine and to supply the energy released thereby at least partially back to the energy accumulators.

In British Published Patent Application GB 2 271 228 A, a power supply is free of interruptions, and under normal conditions a load is supplied by a main power supply, while a battery is uncoupled from the load and from a charging unit. In the case of an interruption of the main power supply, energy is provided to the load by the battery via a controllable voltage system converter and a transformer, whose winding is situated in the bridge arm of the voltage system converter. The battery can be charged by the main power supply via the charging unit, if defined conditions exist.

Japanese Patent Document JP 09-009417 A discloses a bidirectional DC/DC converter which consists of two voltage system converters, with one transformer disposed in-between. Via the transformer, a connection of a main battery connected with a direct voltage of an electric machine as well as another battery provided for feeding an auxiliary machine are supplied.

German Patent Document DE 198 10 467 C1, which is not prior art, discloses a hybrid driving concept for fuel cell vehicles, which contains a DC/DC converter arranged between an energy accumulator and an electric machine which can be driven alternately as a motor or a generator. Furthermore, a fuel cell connected to the electric machine, in addition to feeding the electric machine, can also cause the charging of the energy accumulator by way of the DC/DC converter.

It is an object of the invention to provide an electric vehicle drive of the initially mentioned type, in which one energy source is designed for the base load supply and the other energy source, constructed as an energy accumulator, is designed for short-term load peaks, and in which braking energy can be recovered and utilized efficiently.

This object is achieved by means of an electric vehicle drive in which the second energy source representing an energy accumulator is coupled by way of a bidirectional DC/DC converter to a supply connection of the first energy source connected with the direct-voltage connection of the electric machine. In this manner, braking energy can be supplied during braking operations to the second energy source constructed as an energy accumulator, and on the other hand it is also possible to operate the electric machine by means of energy from the second energy source when load peaks exist. In addition, it is possible to charge the second energy source by way of the DC/DC converter by means of energy of the first energy source.

In one embodiment of the invention, a power cut-off element is assigned to the first energy source, to avoid reverse currents. In this manner, the first energy source can be protected from excess voltage which may occur when recovering braking energy, or when load peaks are present during which the electric machine is operated by means of energy from the second energy source.

In another embodiment of the invention, the bidirectional DC/DC converter is constructed of two voltage system converters of the same type, which can be controlled in a timed manner, in a single-phase bridge with one transformer winding respectively in the bridge arm. In this manner, it is possible, by appropriate timing of the voltage system converters, to supply recovered braking energy to the second electric energy source constructed as an energy accumulator, and to operate the electric machine by means of energy from the first electric energy source as well as from the second energy source.

Other objects, advantages and novel features of the present invention will become apparent from the following detailed description of the invention when considered in conjunction with the accompanying drawings.

BRIEF DESCRIPTION OF THE DRAWINGS

The single FIGURE is a block diagram of an electric vehicle drive according to the invention.

DETAILED DESCRIPTION OF THE DRAWINGS

The illustrated electric vehicle drive 1 has a three-phase inverter 2 with a connected permanently excited synchronous machine 3. However, it may also be constructed as any drive of a different type suitable for the DC power supply. The vehicle drive 1 has a direct voltage connection 4a, 4b to which a first energy source (a traction batter 6) is connected, via a diode 5. (The diode 5 protects this energy source from possibly damaging reverse flows.) As an alternative, the first energy source may also be constructed as a fuel cell, for example.

A first voltage system converter 7 is connected between the first energy source 6 with the diode 5 and the vehicle drive 1. This voltage system converter 7 is inductively coupled with a second voltage system converter 8 by way of a transformer with windings 11, 12. The second voltage system converter 8 is coupled to a power energy accumulator 9 which operates as a second energy source for the vehicle drive 1. The power energy accumulator 9 is formed, for example, by a capacitor and is suitable for delivering and receiving short power peaks which occur during acceleration and braking of a motor vehicle which is driven by the electric vehicle drive.

The inductively coupled voltage system converters 7 and 8 together form a DC/DC converter and are each constructed as a single-phase bridge. They contain transistor switching elements 10 in order to provide, as required, an alternating current flowing in the corresponding bridge arm for the primary and secondary winding 11, 12 of the transformer. Instead of the illustrated bipolar transistors 10, other suitable semiconductor elements, such as the IGBT or the MOS-FET, can also be used. The power transfer and transfer direction of the DC/DC converter formed of the voltage system converters 7 and 8 is determined by the suitable control of the transistors 10 at a control (not shown) frequency which, if possible, is above the threshold of audibility. The transferred power can be adjusted by varying the pulse duty ratio. That is, by appropriate timing of the switching elements 10, the voltage transfer ratio between the traction battery 6 and the power energy accumulator 9 can be regulated. In this case, the winding ratio between the primary and secondary winding 11, 12 of the transformer is selected to correspond to a voltage transfer which permits a pulse duty ratio that is favorable with respect to switching loss performances of the transistors 10.

In order to rapidly increase the power supplied by the power energy accumulator 9 for the acceleration of the vehicle driven by the electric vehicle drive, operation of the transistors 10 in the voltage system converter 8 is timed such that an alternating-voltage signal is transmitted from the secondary winding 12 in the voltage system converter 8 to the primary winding 11 in the voltage system converter 7, which alternating-voltage signal is rectified there by diodes 13. When the acceleration has been concluded, normal average driving power is again provided by way of the traction battery 6, and to the extent necessary, the DC/DC converter formed by the voltage system converters 7 and 8 recharges the power energy accumulator 9. If possible, such recharge is limited to a charge value that is below the full load condition of the accumulator, by an amount of energy which is typical of a regenerative braking, in order to permit a recovery of braking energy during a braking operation in every case.

The switching arrangement for the semiconductor switching elements in the voltage system converters 7 and 8 is advantageously constructed as a pot-type or encapsulated component. As an alternative to a capacitor, the power energy accumulator 9 can also be constructed as an electro-chemical battery or as a flywheel accumulator with a connected mechanical-electrical converter. The physical characteristics of such a flywheel accumulator are largely comparable to the characteristics of a capacitive power energy accumulator. However, while the energy accumulating capacity of a capacitive accumulator is proportional the square of the voltage, in the case of flywheel energy accumulators, the stored energy is a function of the square of the rotational speed. In the event that a converter with a constant excitation is assigned to the flywheel, the rotational speed of the flywheel is approximately proportional to the terminal voltage, so that the electric energy accumulated by the flywheel is proportional to the square of the terminal voltage of the flywheel accumulator.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An electric vehicle drive, comprising:

an electric machine which can be driven alternatively as a motor or as a generator, and which has a direct voltage connection to which a supply voltage can be applied from a first energy source and a second energy source; wherein the first energy source is adapted to provide a base load power supply of the electric machine;

the second energy source comprises an energy accumulator which is adapted for a short-term peak load supply of the electric machine, and for storing vehicle braking energy generated by the electric machine when operated as a generator; and the second energy source is coupled by way of a bidirectional DC/DC converter to a supply connection of the first energy source, which is connected with the direct-voltage connection of the electric machine; wherein the bidirectional DC/DC converter comprises first and second voltage system converters of the same construction, which can be controlled in a timed manner in a single-phase bridge; and said voltage converters of said first and second converters are inductively coupled via a transformer having a first and second windings; one transformer winding being disposed respectively in the bridge arm of each said first and second converters.

2. An electric vehicle drive according to claim 1, wherein a power cut-off element is assigned to the first energy source for avoiding reverse flows.

3. An electric vehicle drive, comprising:

an electric machine which can be driven alternatively as a motor and as a generator;

a first energy source capable of providing a sustained load power supply for driving the electric machine in substantially steady state conditions;

a second energy source and capable of providing a short term peak load power supply for driving the electric machine during an acceleration of the vehicle, and capable of storing vehicle braking energy generated when the electric machine is operated as a generator; and a DC-DC converter coupling said first and second energy sources and said input of said electric machine, for regulating a bidirectional transfer of energy between said first energy source and said second energy source, and between said energy sources and said electric machine; wherein said DC-DC converter comprises:

a first bridge circuit having a first plurality of controllable switching elements and being connected between said first energy source and said input of the electric machine;

a second bridge circuit having a second plurality of controllable switching elements and being connected between said second energy source and said input of the electric machine; and a transformer having a primary winding coupled into the first bridge circuit and a secondary winding coupled into the second bridge circuit, for bidirectional transfer of electric energy between said first and second energy sources in response to switching of said first or second plurality of controllable switching elements.

4. A power supply for an electric vehicle drive having an electric machine which can be driven alternatively as a motor and as a generator, comprising:

a first energy source capable of providing a sustained load power supply for driving the electric machine in substantially steady state conditions;

a second energy source capable of providing a short term peak load power supply for driving the electric machine during an acceleration of the vehicle, and capable of storing vehicle braking energy generated when the electric machine is operated as a generator; and a DC-DC converter coupling said first and second energy sources and said input of said electric machine, for regulating a bidirectional transfer of energy between said first energy source and said second energy source, and between said energy sources and said electric machine; wherein said DC-DC converter comprises:

a first bridge circuit having a first plurality of controllable switching elements and being connected between said first energy source and said input of the electric machine;

a second bridge circuit having a second plurality of controllable switching elements and being connected between said second energy source and said input of the electric machine; and a transformer having a primary winding coupled into the first bridge circuit and a secondary winding coupled into the second bridge circuit, for bidirectional transfer of electric energy between said first and second energy sources in response to switching of said first or second plurality of controllable switching elements.

* * * * *